United States Patent Office 2,835,330
Patented May 20, 1958

2,835,330

METHOD OF BLOCKING THE WAYS OF DAMPS IN MINES

Wilhelm Bauer, Essen, Germany

No Drawing. Application August 20, 1954
Serial No. 451,281

Claims priority, application Germany August 20, 1953

2 Claims. (Cl. 169—1)

For the safety in mines it is most important to prevent the self-enkindling of the handled minerals and to fight the fire. This task concerns concerns especially coalpits, as well as mines of sulphur-minerals of iron and copper.

It is well known to block the ways of damps mentioned above by stonedust, clay, sand or such like. Furthermore, sometimes one puts up boards behind which there are fillings with the materials mentioned before.

The method according to this invention consists in blocking the ways of damps by the use of such a foamy material which hardens after having been sprayed, which clings to its surroundings and which keeps up its volume as well as its structure permanently.

This foamy material hardens within a few minutes after being sprayed. The basic-material needs very little space and is always ready for use. Its action for forming the foam is very quick, hereby blocking the dangerous channels so that the oxygen cannot pass through.

It is important furthermore that the hardening foam clings quite closely to all shapes and uneven forms of the ways or surfaces to be blocked. Any corners and edges are being filled by the foam.

For the invention there is especially used a synthetic resin-foam agent, which chiefly consists of a mixture of an easily foaming solution of a foam-material and of the solution of an urin-substance-resin. For instance, the aqueous solution of a partial condensate of urin-substance and formaldehyde is used with the addition of a catalysator such as phosphoric acid or oxalacid together with a foam-producing agent. Such resin is an agent for hardening or stiffening the foam. The agent for hardening can be used in a dissolved condition, like the mentioned solution of resin, and added to the prepared foam in the usual manner only just immediately before the nozzle for spraying the foam.

The solution of the foam material may contain the catalysator for the dissolved partial-resin.

For the above mentioned purpose there have been proposed known extinguishing foams, also with the admixture of a stabilisator. These foams fall back after a short time, while the foam prepared according to the invention becomes stiff and keeps its stiffness permanently.

I claim:

1. Method of blocking fire damp in mines, comprising adding phosphoric acid as a catalyst to the solution of a foam-forming material, simultaneously spraying the solution obtained and a solution of a preliminary condensate of a urea-formaldehyde resin into spaces where the blocking is intended, and allowing the foam formed to become firm by the solidifying action of said condensate and thus to form firm damp-blocking means maintaining its volume and foamy structure.

2. Method of blocking fire damp in mines, comprising adding oxalic acid as a catalyst to the solution of a foam-forming material, simultaneously spraying the solution obtained and a solution of a preliminary condensate of a urea-formaldehyde resin into spaces where the blocking is intended, and allowing the foam formed to become firm by the solidifying action of said condensate and thus to form firm damp-blocking means maintaining its volume and foamy structure.

References Cited in the file of this patent

UNITED STATES PATENTS 2,551,919     Williamson et al. _____ May 18, 1951